United States Patent

[11] 3,630,372

[72] Inventors Francis S. Weir
Aurora;
Douglas E. Dreier, North Aurora, both of Ill.
[21] Appl. No. 36,773
[22] Filed May 13, 1970
[45] Patented Dec. 28, 1971
[73] Assignee Chicago Bridge & Iron Company
Oak Brook, Ill.

[54] GRIT CHAMBER STIRRED BY EDUCTOR TUBE ENCLOSING VERTICALLY ADJUSTABLE GRIT LIFT
4 Claims, 2 Drawing Figs.

[52] U.S. Cl. .................................................. 210/197,
210/207, 210/525
[51] Int. Cl. .................................................. B01d 12/00,
B01d 43/00
[50] Field of Search .......................................... 210/49,
197, 525, 207

[56] References Cited
UNITED STATES PATENTS
1,912,595  6/1933  Schlenz ........................ 210/197 X
3,152,982  10/1964  Pagnotti ....................... 210/197 X
FOREIGN PATENTS
496,971  11/1950  Belgium ....................... 210/207

Primary Examiner—Samih N. Zaharna
Assistant Examiner—Frederick F. Calvetti
Attorney—Darbo, Robertson & Vandenburgh ABSTRACT: In a grit chamber the rolling action which allows selective settling of grit is maintained by a centrally located draft tube actuated by air liberation near the bottom thereof. Grit accumulating at the bottom of a hopper concentric with the draft tube is removed by an airlift extending along the axis of the draft tube and having its bottom section vertically adjustable to compensate for varying grit depth.

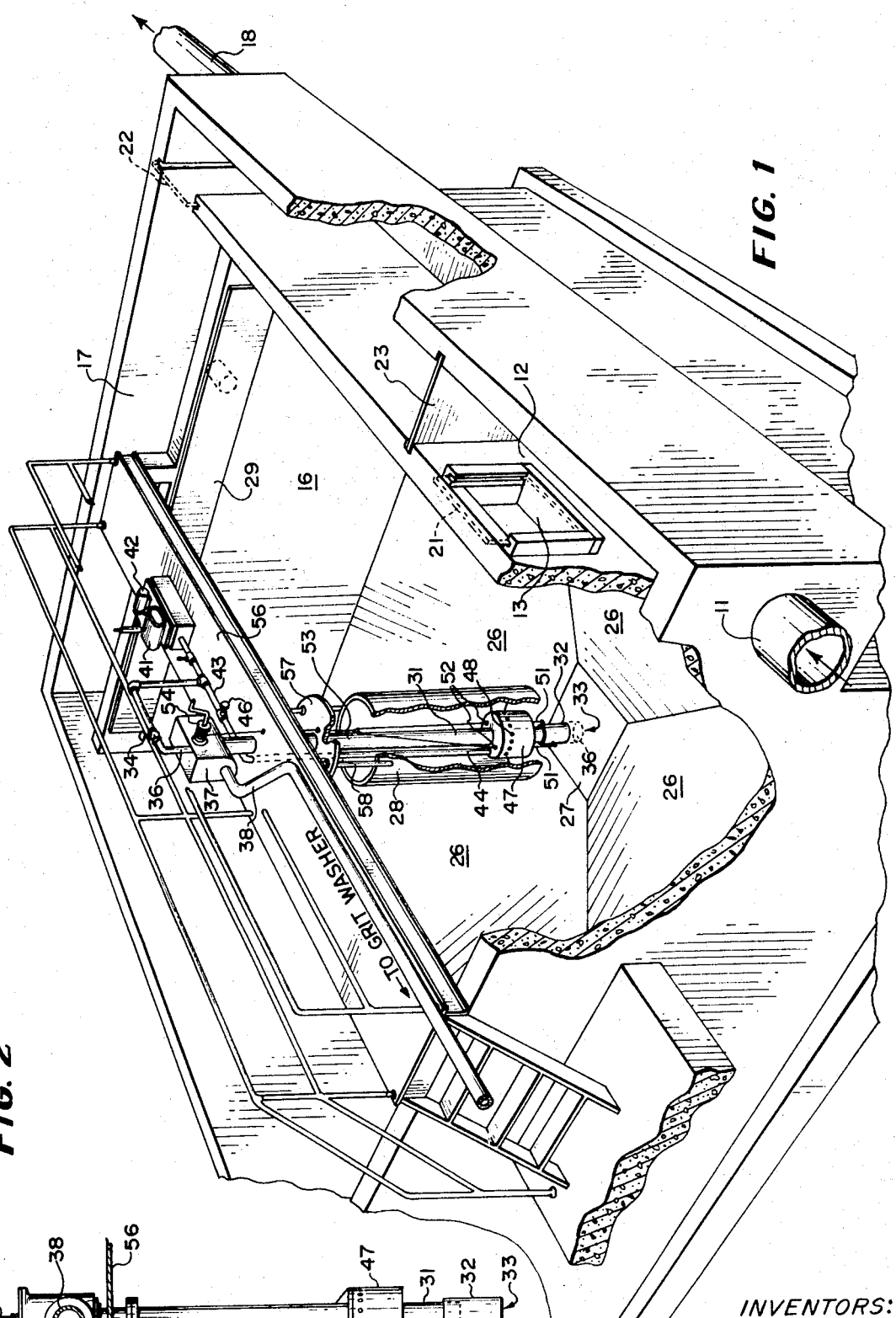
INVENTORS:
FRANCIS S. WEIR
DOUGLAS E. DREIER
By Darbo, Robertson, & Vandenburgh
Attorneys

GRIT CHAMBER STIRRED BY EDUCTOR TUBE ENCLOSING VERTICALLY ADJUSTABLE GRIT LIFT

INTRODUCTION

The invention of which the present disclosure is offered for public dissemination in the event that patent protection is available, relates to grit removal from sewage. In most sewage treatment plants the incoming sewage is subjected to grit removal prior to the main treatment of the sewage. A very common general class of grit removal tanks is represented by U.S. Pat. No. 2,532,457, having been developed earlier by Charles H. Hurd. Incoming sewage passes through the tank, and while in the tank is continuously circulated therein with the rolling movement at a speed which selectively allows the grit to settle while the organic solids are retained in suspension. In the early forms of such tanks, air was liberated along one side of the tank, near its bottom, to produce a desired circulation or roll. More recently advantages have been recognized in utilizing a type of grit chamber furnished by Walker Process Equipment Division of Chicago Bridge & Iron Company, using an eductor tube centrally located with respect to the tank, a development credited to Chester A. Obma. Air liberated within the eductor tube sets up a toroidal type of rolling circulation. With the help of a floor or hopper sloping from all sides toward the central area, grit accumulates at the central area. It can be removed from this central location by the airlift pump, the grit sometimes being conveyed to a grit-washing unit for washing putrescible organic material from the grit so that the grit could be disposed of without being obnoxious. The airlift pumps for removing the grit from chambers of this eductor-tube type have heretofore been troublesome.

According to the present invention, the airlift for the grit extends down through the center of the eductor tube. This makes it possible to provide in an entirely satisfactory manner two desirably features which were not both provided successfully in prior grit chambers of the eductor-tube type: The airlift pump for the grit draws grit from the center of the grit accumulation; and the height of the bottom of the grit-lift tube be adjustable. With the grit-lift tube extending down along the outside of the eductor tube as heretofore, such an opening could be centered under the eductor tube by sloping the bottom portion of the grit-lift tube. Such sloping bottom portion did not lend itself to adjustment for the height of the suction opening by the known expedient of making the lower section movable along its axis.

Placing the grit-lift along the axis of the eductor tube overcomes the mechanical difficulties and also maintains the suction opening properly centered regardless of its height. In addition, the grit-lift tube provides a convenient support for an air-diffusing bowl, which in turn provides a convenient guide for the grit-lift adjustment cables.

Additional advantages and objects of the invention may be apparent from the following description and from the drawings.

DESIGNATION OF FIGURES

FIG. 1 is of the perspective or isometric type, with parts broken away for clarity.

FIG. 2 is a mainly elevational view showing especially a modified form of adjusting the grit-pump foot.

BACKGROUND DESCRIPTION

In some respects the grit chamber representing the present invention is conventional for eductor tube type grit chambers. When the grit chamber is in operation, sewage flows in through the inflow pipe 11 to channel 12 and through port 13 into the grit chamber. The grit chamber has four sidewalls, of which the wall 16 is lower than the rest to allow liquor to overflow into outflow channel 17, which opens to outflow pipe 18. IF it should be desired to bypass this grit chamber, gates 21 and 22 are inserted and gate 23 is removed, causing the sewage to flow directly from inflow pipe 12 to outflow pipe 18.

The pipe 18 leads to further treatment units, the first often being a primary settling tank, much larger than the grit chamber 16 so that the retention time is longer and such organic solids as are readily settable will settle, the solids and the effluent passing separately to further treatment units. The floor of the grit chamber comprises four sloping surfaces 26, forming a large hopper so that grit can easily be moved to the center floor area or hopper bottom 27. An eductor tube 28 having its upper end below the surface level extends down deep into the tank, so that when air is liberated within the eductor tube 28 it will cause a large volume of tank liquor to rise and flow out in all directions, drawing liquor in at the bottom of the eductor tube, thereby setting up a rolling circulation of generally toroidal nature. By releasing the proper amount of air in a properly sized eductor tube, the speed of circulation of the tank contents is made such that grit will settle to the floor portions 26 and roll down them to the bottom portion 27, while organic solids will remain entrained in the circulating liquid and pass with this liquid out of the tank. To control the outflow of foam which is likely to form where there is air liberation, a baffle 29 extending below surface level may be provided.

IMPROVED AIRLIFT FEATURES

The removal of grit from the hopper bottom 28 has been somewhat troublesome. The amount of grit in sewage varies from time to time, and hence the rate of accumulation on hopper bottom 27 varies. It is inefficient to have to check frequently to see if there is such an accumulation that grit should be removed. Yet if too much grit is allowed to accumulate before removal, it tends to bury the suction intake of any pumping means. Airlift pumps are preferred for simplicity and because of minimum service requirements, but they work best when the suction outlet is slightly above the gathered grit. The outlet cannot simply be positioned so high that it will never be buried because then it would fail to suck out all of the grit. In other surroundings airlift grit pumps have overcome this difficulty by providing a vertically adjustable foot, but this has not heretofore worked out well with eductor tube grit chambers.

According to the present invention, the grit pump tube extends inside of eductor tube 28, along its axis. This permits both the eductor tube 28 and the pump tube 31 to be centered over the center of floor 27, so that grit accumulates symmetrically with respect to both. Accordingly, a shiftable foot tube 32 can be applied to the end of the main pump tube 31 to raise and lower the suction opening 33.

When it is desired to pump grit, valve 34 is opened to supply air through riser 36 extending down through tube 31 to discharge air within this tube near the bottom thereof. The air rising through the water in tube 31 reduces the weight of this water so that the hydrostatic pressure surrounding the tube 31 causes a vigorous upflow through the tube to air release box 37. This vigorous flow sweeps the grit into suction opening 33 and up through the tube 31. In box 37 the air escapes to atmosphere and the liquor carrying the grit flows through an outflow pipe 38, preferably to a grit washing unit, not shown, the overflow from this washing unit usually returning to the main stream of sewage, and the grit being stored for disposal.

The air for the grit-lift pump is supplied by a blower 41. This blower is normally constantly driven by a motor 42, inasmuch as the blower also supplies air for activating eductor tube 28. This air flows through pipes 43 and 44, valve 46 being normally open. Pipe 44 extends through the top of an inverted bowl 47 which is perforated to form a row of orifices 48 extending entirely around the bowl 47. The bowl 47 extends several inches below the perforations 48 so as to maintain a water seal under normal conditions. The air is supplied in sufficient quantity to create enough back pressure to force the air through the orifices in vigorous streams so that the air can spread throughout the cross section of the flow area between the bowl 47 and the eductor tube 28. The bowl 47 may be carried by one or both of pipe 44 and pump tube 31. Preferably it is secured to the pump tube 31 since this tube is more sturdy and is centrally located with respect to bowl 47. Hence it is sealed or substantially sealed to the tube 31. It is substantially sealed also to the pipe 44, but for convenience this need not be a complete or tight seal inasmuch as minor escape of air around pipe 44 is almost as useful as if the same air were added to the flow through orifices 48.

The foot 32 can be raised and gravity-lowered by a pair of strands 51 (or a rod 50, FIG. 2) secured near the top of foot 32. In the case of strands 51, it is important that these strands extend vertically from the foot 32 to minimize friction so that the foot 32 will reliably lower itself by gravity when the strands permit. This is easily accomplished by providing fairlead apertures 52 in vertical alignment with the securing points of the strands 51 to foot 32. From apertures 52 these strands 51 may extend generally upwardly but somewhat around the pump tube 31 to be joined together at a point from which a single strand 53 extends upwardly to a winch 54 which may be mounted on any convenient structure such as air release box 37. The winch 54 is shown somewhat diagrammatically. It would of course be provided with a ratchet and pawl or other locking means.

If rod 50 is used it has a snug fit through the top of bowl 47 and through guides 61. It is raised or thrust down by threaded rod 62, actuated by hand wheel 63 journaled in bracket 64.

The eductor tube 28, pump tube 31 and associated parts are carried from above as by bridge 56. The blower 41 can also be located on this bridge, shortness of air lines being desirable for economy.

Preferably a baffle 57 is provided at about surface level to convert the upwardly moving kinetic energy of the liquor to outwardly moving energy. This permits the desired speed of circulation to be achieved with slightly less air pumpage and hence slightly improved economy.

ACHIEVEMENT

From the foregoing it is apparent that a very dependable and trouble-free grit removal system has been provided in conjunction with eductor tube grit removal apparatus. An operator can safely allow a large amount of grit to accumulate, then open grit pumping valve 34 and turn the winch 54 to raise the foot 32 until a satisfactory flow is achieved. As pumping continues, he can unwind line 53 from reel 54 to gravity-lower the foot 32 50 that it will not be too far above the grit. In this way he can clean the grit as thoroughly as he desires from the central bottom area 27.

It might seem that all of the equipment within the eductor tube 28 would necessitate a substantially larger eductor tube. That has been found not to be the case, however. The pumping tube 31 occupies only a very small part of the cross section of the eductor tube 28. The bowl 47 occupies a somewhat larger portion of the cross section, but this is in a region where a moderately reduced flow area is relatively unobjectionable. As the air expended in the liquor as its rises above the bowl 47, the liquor and air mixture occupies more space than the liquor alone as it is flowing in the space surrounding the bowl 47.

Inasmuch as grit chambers are used ahead of primary settling tanks, there is usually considerable stringy material in the sewage at this point and locating apparatus inside of the eductor tube might seem to be inviting trouble due to the hanging up of this stringy material and clogging or reduced flow area. However, none of the parts described lie across the flow so as to cause stringy material to hand up on them. The hanger brackets 58 carrying eductor tube 28 lie across the outflow from eductor tube 28, but the top of the eductor tube 28 is so far below the surface level that there is ample spare outflow cross section so that if stringy material catches on the hanger bars 58, that is of no consequence.

We claim:

1. In a grit removal chamber for removing grit from sewage flowing through the chamber, an eductor tube for setting up a rolling circulation of the contents of the chamber, an airlift grit removal pump extending along the axis of the eductor tube, projecting downwardly from the eductor tube and having a vertically shiftable foot for varying the proximity of the pump's suction opening above the floor;

an inverted bowl surrounding and substantially sealed to the pump in the lower portion of the eductor tube, said bowl having peripheral orifices for discharge of air to actuate the eductor tube, an air supply conduit leading into said bowl, and flexible strands for shifting the foot extending vertically through fairlead apertures of the bowl and rising therefrom to a common adjustment means.

2. Grit chamber apparatus including an eductor tube for circulating the liquid in the grit chamber; an air lift pump comprising a smaller tube extending along the axis of the eductor tube, means for liberating air within and near the bottom of the smaller tube, and a foot tube shiftable along said smaller tube for varying the height of the suction opening above the bottom of the chamber;

inverted bowl surrounding the smaller tube within the eductor tube substantially sealed to the smaller tube and spaced from the eductor tube to provide a flow passage therebetween, and having peripherally disposed orifices for discharging air into the lower portion of the eductor tube to cause circulation of sewage within the chamber;

and means for adjusting the shiftable foot tube from above the eductor tube, said means including a pair of strands secured to the foot tube and extending through fair-lead apertures in the bowl.

3. Grit chamber apparatus including an eductor tube for circulating the liquor in the grit chamber; an airlift pump comprising a smaller tube extending along the axis of the eductor tube, means for liberating air within and near the bottom of the smaller tube, and a foot tube shiftable along said smaller tube for varying the height of the suction opening above the bottom of the chamber;

an inverted bowl surrounding the smaller tube within the eductor tube substantially sealed to the smaller tube and spaced from the eductor tube to provide a flow passage therebetween, and having peripherally disposed orifices for discharging air into the lower portion of the eductor tube to cause circulation of sewage within the chamber;

and means for adjusting the shiftable foot tube from above the eductor tube.

4. Grit chamber apparatus including an eductor tube for circulating the liquor in the grit chamber; and airlift pump comprising a smaller tube extending along the axis of the eductor tube, means for liberating air within and near the bottom of the smaller tube, and a foot tube shiftable along said smaller tube for varying the height of the suction opening above the bottom of the chamber;

means for liberating air within the eductor tube to cause circulation of sewage within the chamber;

and means for adjusting the shiftable foot tube from above the eductor tube.

* * * * *